(12) United States Patent
Oshima et al.

(10) Patent No.: US 7,172,040 B2
(45) Date of Patent: Feb. 6, 2007

(54) RIDING TYPE MOWER

(75) Inventors: Hiroshi Oshima, Osaka (JP);
Katsuhiko Uemura, Sakai (JP);
Tomoyuki Morikawa, Takatsuki (JP);
Hiroshi Shimada, Nara-ken (JP);
Masashi Osuga, Nara-ken (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/069,574

(22) Filed: Mar. 1, 2005

(65) Prior Publication Data
US 2005/0284685 A1 Dec. 29, 2005

(30) Foreign Application Priority Data
Jun. 24, 2004 (JP) ............................. 2004-186436

(51) Int. Cl.
*B62D 6/00* (2006.01)
*F16H 57/04* (2006.01)

(52) U.S. Cl. ............... 180/6.2; 180/6.24; 74/606 R

(58) Field of Classification Search .............. 280/6.2, 280/6.3, 6.24, 211, 233, 242, 236, 249, 340, 280/414; 56/13.3, 320.2; 60/416, 378, 469; 477/138, 5; 192/48.3, 87.13; 74/606 R, 74/15.69
See application file for complete search history.

(56) References Cited

U.S. PATENT DOCUMENTS

| | | | |
|---|---|---|---|
| 2,994,392 A | 8/1961 | Kosman | 180/6.24 |
| 4,669,559 A | 6/1987 | Fukui | 180/6.24 |
| 4,674,287 A | 6/1987 | Ishimori et al. | 60/416 |
| 4,856,611 A | 8/1989 | Teraoka et al. | 180/233 |
| 4,887,686 A | 12/1989 | Takei et al. | 180/211 |
| 5,301,769 A | 4/1994 | Weiss | 180/249 |
| 5,415,603 A | 5/1995 | Tuzuki et al. | 477/5 |
| 5,971,719 A * | 10/1999 | Takeuchi | 477/156 |
| 6,038,840 A | 3/2000 | Ishimori et al. | 56/13.3 |
| 6,189,641 B1 | 2/2001 | Azuma | 180/242 |
| 6,450,309 B1 | 9/2002 | Hirai et al. | 192/48.3 |
| 6,638,194 B2 | 10/2003 | Ishikawa et al. | 180/248 |
| 6,874,305 B2 | 4/2005 | Ishimori | 56/10.8 |
| 2004/0216554 A1 * | 11/2004 | Kawakubo et al. | 74/606 R |
| 2004/0226528 A1 * | 11/2004 | Inui et al. | 123/90.34 |
| 2004/0231925 A1 * | 11/2004 | Matsushima | 184/6.23 |

FOREIGN PATENT DOCUMENTS

JP 2001-86831 4/2001

* cited by examiner

*Primary Examiner*—Hau Phan
(74) *Attorney, Agent, or Firm*—The Webb Law Firm

(57) ABSTRACT

A work vehicle comprises: a plurality of wheels; a vehicle body supported by the wheels; a transmission case provided on the vehicle body, the transmission case having a first case portion and a second case portion and a middle portion extending between respective lower portions of the first and second case portions, the transmission case being divided by an abutting surface extending in a vertical direction of the vehicle; a hydraulic device associated with the transmission case; a hydraulic pump supplying a hydraulic fluid to the hydraulic device; an oil path formed in a surface of the abutting surface, one end of the oil path being formed in the first case portion as an oil port for the hydraulic device, and the other end of the oil path opening to the second case portion; and a hydraulic fluid outlet provided to the first case and connected to the hydraulic pump to supply hydraulic fluid to the hydraulic pump.

6 Claims, 8 Drawing Sheets

RIDING TYPE MOWER

BACKGROUND OF THE INVENTION

The present invention relates to the structure of a transmission case supporting the right and left rear wheels in a riding type mower.

As disclosed for example in JP 2001-86831A, there are riding type mowers including a vehicle body supported by the right and left front wheels and the right and left rear wheels, a mower, and a grass collector at the rear of the vehicle body. A duct extending from the mower passes between the right and left rear wheels and is connected to the grass collector, so that the grass that has been cut by the mower is guided through the duct to the grass collector.

In the mower disclosed in JP 2001-86831A, the transmission case comprises right and left supporting portions supporting the right and left rear wheels, and a middle portion that is located below the duct and that is connected to the right and left supporting portions. Thus, the motive power of the engine is transmitted from either the left or the right supporting portion of the transmission case to the light or left rear wheel, and transmitted to the left and right rear wheel from the right or left supporting portion on the other side of the transmission case, via a transmission shaft that is arranged in the middle portion of the transmission case.

In JP 2001-86831A, the thin middle portion is connected between the right and left supporting portions of the transmission case. Thus, when hydraulic fluid is filled as lubricating oil into the transmission case (oil bath), the hydraulic fluid in the right and left supporting portions of the transmission case becomes difficult to circulate, so that the hydraulic fluid in the right and left supporting portions of the transmission case tends to stagnate.

SUMMARY OF THE INVENTION

It is an object of the present invention to provide a riding type mower, whose transmission case includes first and second case portions and a middle portion connecting the first and second case portions, where there is little stagnation of the hydraulic fluid in different portions of the transmission case.

To achieve this object, a work vehicle in accordance with an embodiment of the present invention comprises a plurality of wheels; a vehicle body supported by the wheels; a transmission case provided on the vehicle body, the transmission case having a first case portion and a second case portion and a middle portion extending between respective lower portions of the first and second case portions, the transmission case being divided by an abutting surface extending in a vertical direction of the vehicle; a hydraulic device associated with the transmission case; a hydraulic pump supplying a hydraulic fluid to the hydraulic device; an oil path formed in a surface of the abutting surface, one end of the oil path being formed in the first case portion as an oil port for the hydraulic device, and the other end of the oil path opening to the second case portion; and a hydraulic fluid outlet provided to the first case and connected to the hydraulic pump to supply hydraulic fluid to the hydraulic pump.

With this configuration, hydraulic fluid returning from the hydraulic device circulates from the first case portion of the transmission case through the middle portion to the second case portion, and thus there is little stagnation of the hydraulic fluid in the first and second case portions of the transmission case.

DETAILED DESCRIPTION OF PREFERRED EMBODIMENTS

Figure 1:
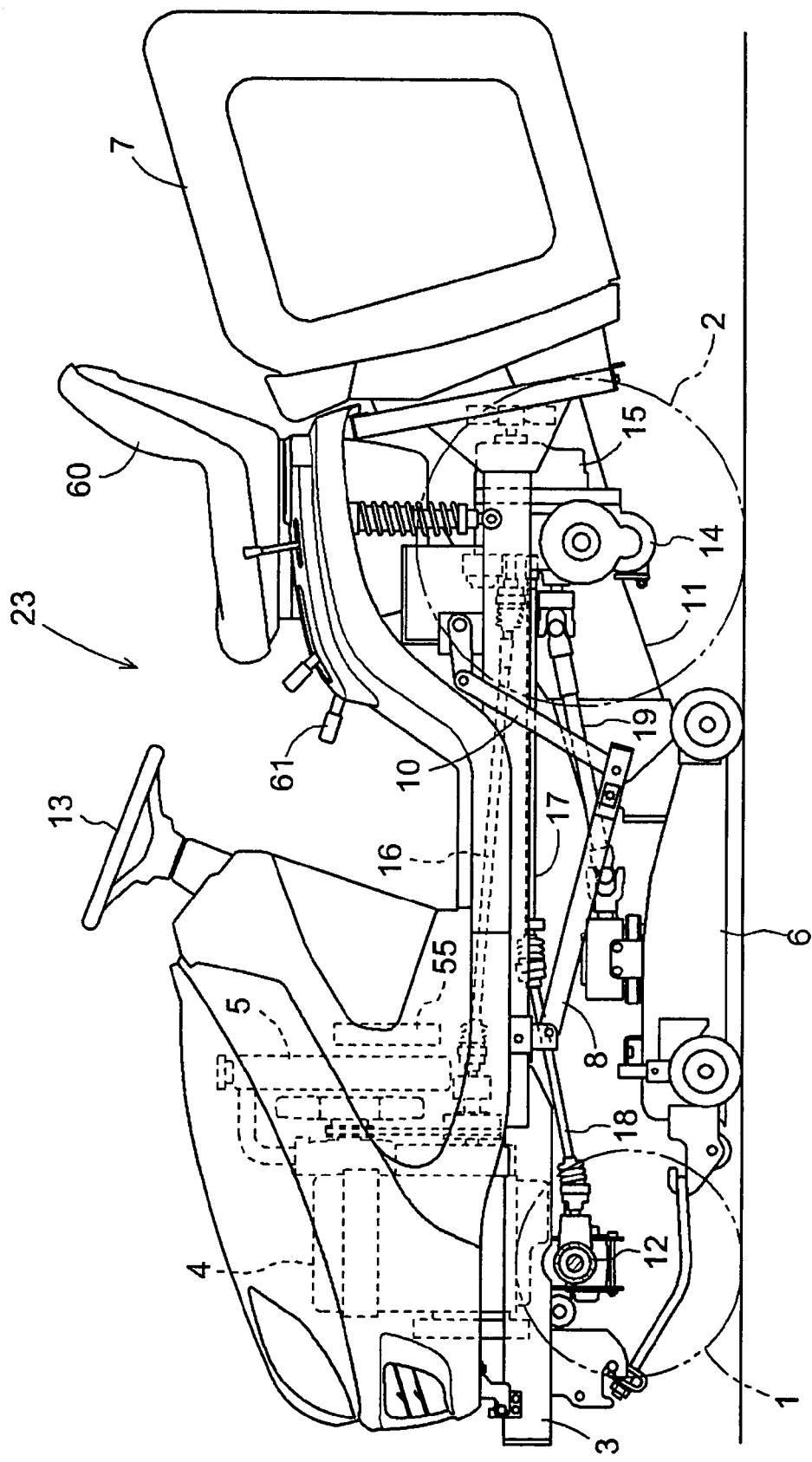
FIG. 1 is an overall lateral sectional view of a riding type mower.

As shown in FIG. 1, in a riding type mower in accordance with an embodiment of the present invention, an engine 4 and a radiator 5 are supported at the front of a vehicle frame 3, which is supported by right and left front wheels 1 and right and left rear wheels 2. A operator's station 23 is supported above the middle of the vehicle frame 3, and a mower 6 is supported below the middle of the vehicle frame 3. A grass collector 7 is supported at the rear of the vehicle frame 3.

Figure 2:
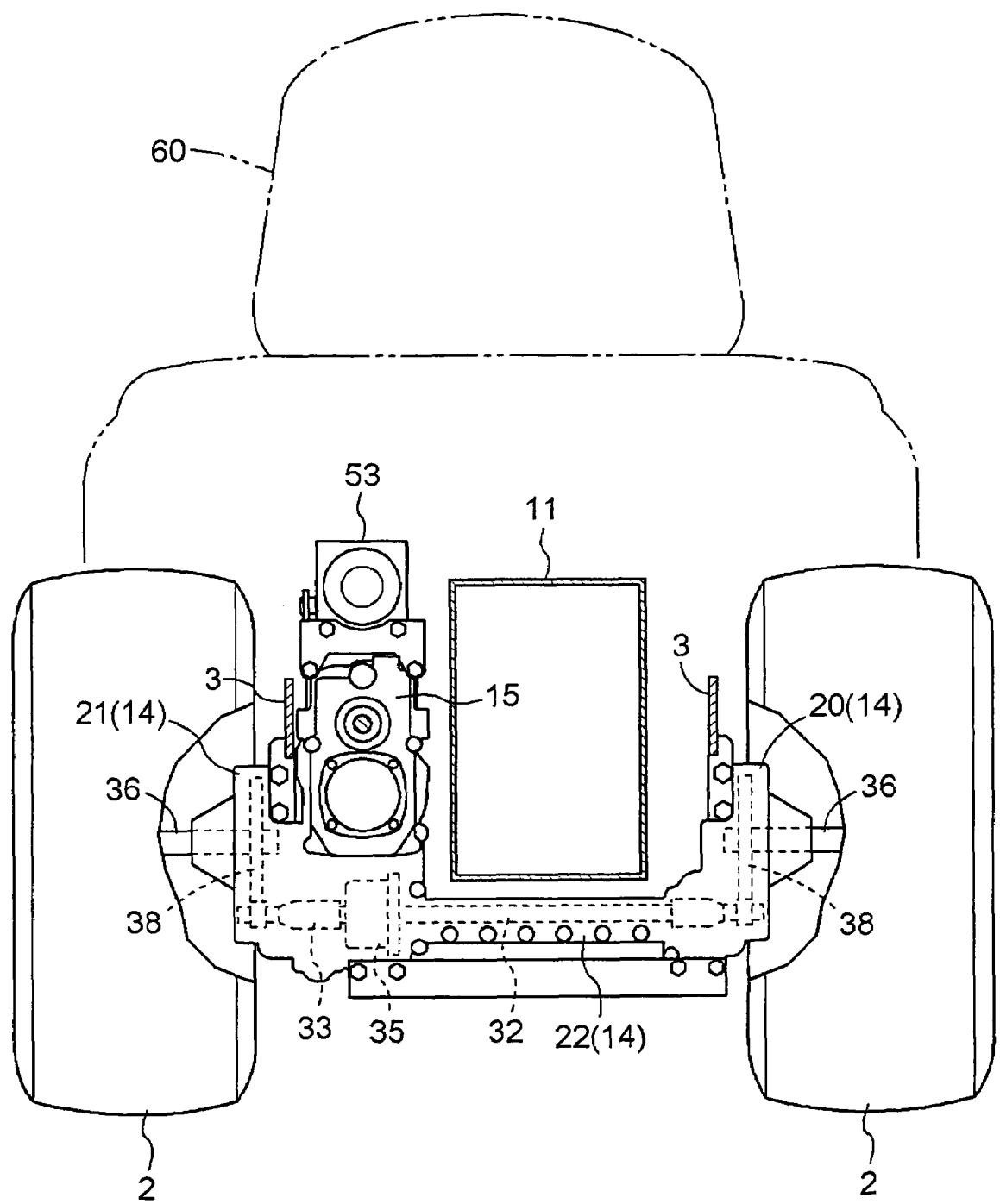
FIG. 2 is a vertical sectional view of a riding type mower taken from the rear.

As shown in FIG. 1, the mower 6 is supported by a link 8 that is connected such that it is pivotable in vertical direction to the vehicle frame 3. A link 10 is connected between the mower 6 and a lift cylinder 9 (see FIG. 10; corresponds to the hydraulic device) in the vehicle frame 3. The mower 6 is raised and lowered by the lift cylinder 9. As shown in FIGS. 1 and 2, a duct 11 extending from the mower 6 passes between the left and rear wheels and is connected to the grass collector 7, so that the grass that is cut by the mower 6 is guided through the duct 11 to the grass collector 7.

As shown in FIG. 1, a front axle case 12 is supported at the front of the vehicle frame 3, and the right and left front wheels 1 are supported in a steerable manner by the front axle case. The right and left front wheels 1 are steered by a steering handle 13 that is provided in the operator's station 23. A transmission case 14 and a hydrostatic continuously variable transmission 15 are fixed to the rear of the vehicle frame 3, and the right and left rear wheels 2 are supported by the transmission case 14. The motive force of the engine 4 is transmitted via a transmission shaft 16 to the hydrostatic continuously variable transmission 15 and to the right and left rear wheels 2, and motive force is transmitted from the hydrostatic continuously variable transmission 15 via transmission shafts 17 and 18 and the front axle case 12 to the right and left front wheels 1. Motive power that is branched off immediately before the hydrostatic continuously variable transmission 15 is transmitted via a transmission shaft 19 to the mower 6.

The following is a description of the structure of the transmission case 14.

Figure 5:
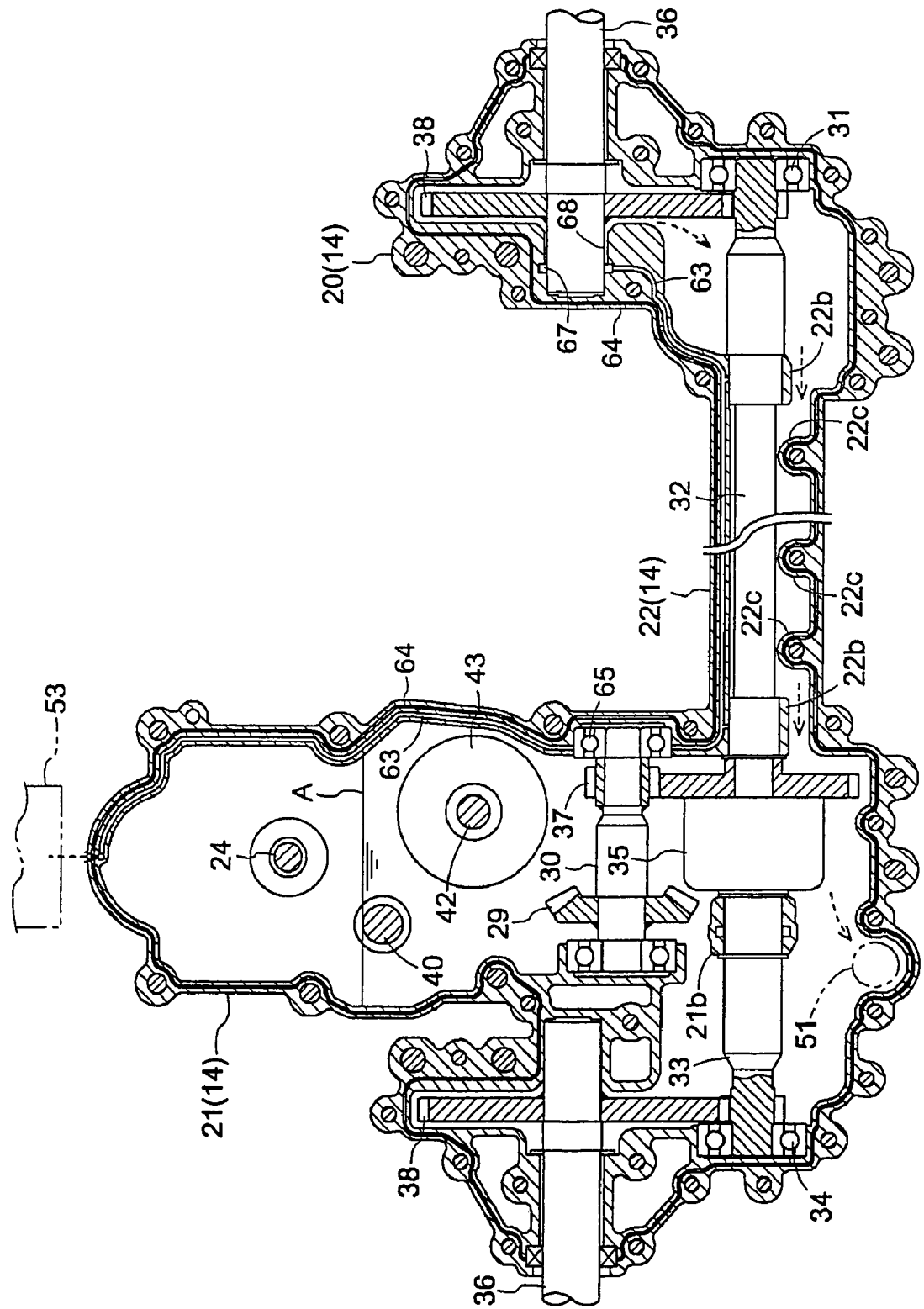
FIG. 5 is a vertical sectional view of the transmission case, taken from the rear.

As shown in FIGS. 2 and 5, the transmission case 14 includes a right supporting portion 20 supporting the right rear wheel 2 with a right axle 36, a left supporting portion 21 supporting the left rear wheel 2 with a left axle 36, and a middle portion 22 connected between the lower portions of the right and left supporting portions 20 and 21. The duct 11 is positioned above the middle portion 22 of the transmission case 14, between the right and left supporting portions 20 and 21 of the transmission case 14. That is to say, the middle portion 22 of the transmission case 14 is positioned below the duct 11.

Figure 6:
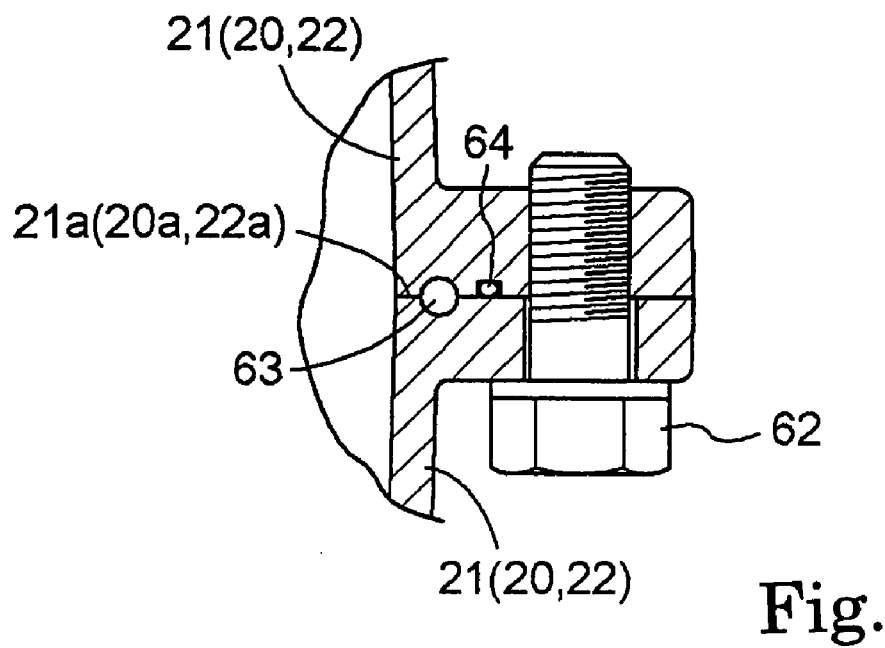
FIG. 6 is a sectional view of the vicinity of an abutting surface of the transmission case.

As shown in FIGS. 6, 7, 8 and 9, the right and left supporting portions 20 and 21 as well as the middle portion 22 of the transmission case 14 are each split into a front part and a rear part by abutting surfaces 20*a*, 21*a* and 22*a* extending in the lateral and vertical directions of the vehicle. As shown in FIG. 5, the front part of the right and left supporting portions 20 and 21 and the front part of the middle portion 22 of the transmission case 14 are formed in one piece. Also the rear part of the right and left supporting portions 20 and 21 and the rear part of the middle portion 22 of the transmission case 14 are formed in one piece. The front part of the right and left supporting portions 20 and 21 of the transmission case 14, the front part of the middle portion 22, the rear part of the right and left supporting portions 20 and 21 of the transmission case 14, and the rear part of the middle portion 22 are linked by bolts 62 (see FIGS. 6, 8 and 9). FIG. 6 is a sectional view taken in the horizontal plane, and the upward direction in FIG. 6 corresponds to the front direction of the vehicle. As shown in FIGS. 1 and 2, the hydrostatic continuously variable transmission 15 is linked to the rear surface of the rear part of the left supporting portion 21 of the transmission case 14.

Figure 3:
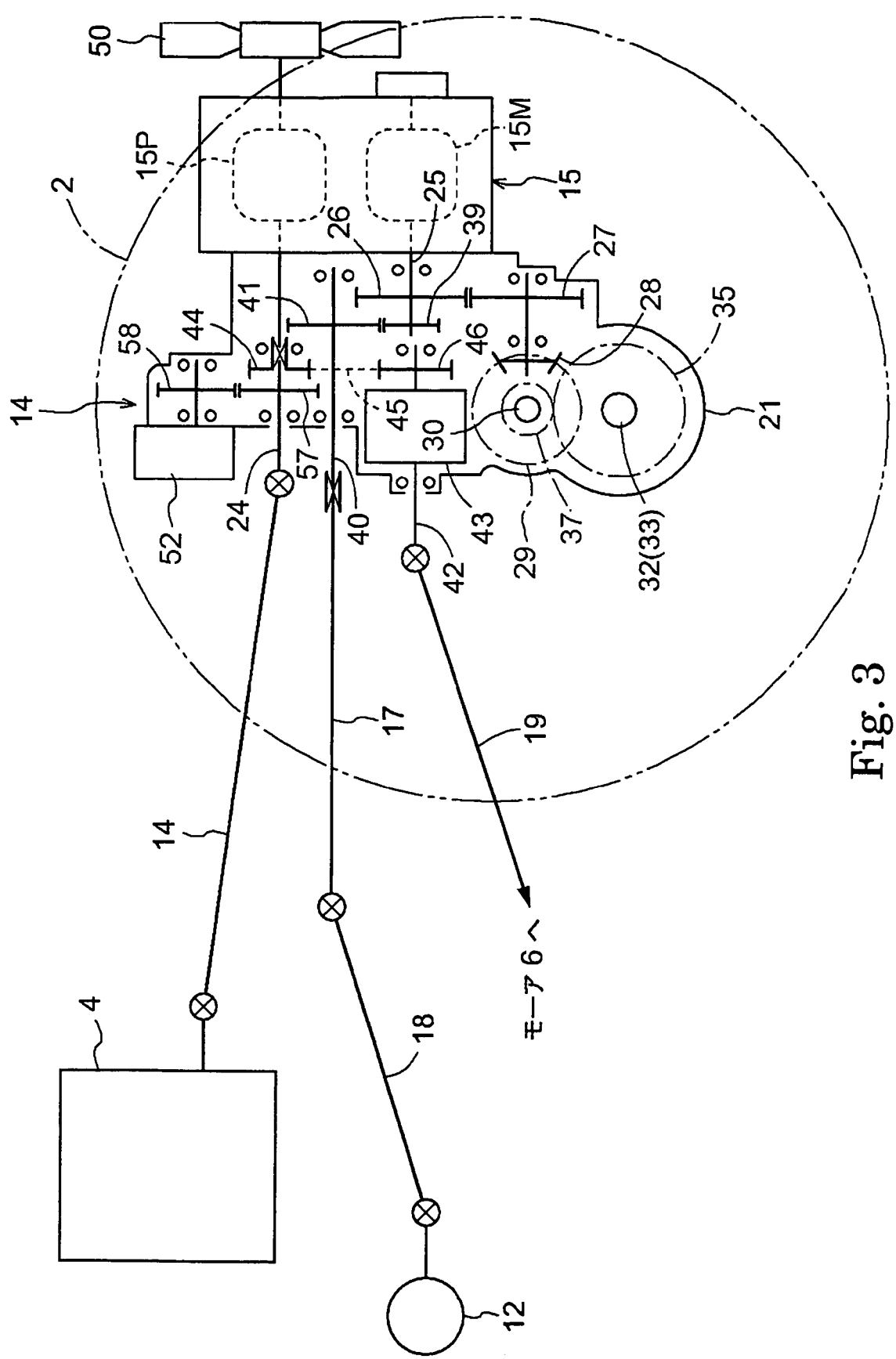
FIG. 3 is a diagrammatic lateral view of the transmission system from the engine to the transmission case, the hydrostatic continuously variable transmission, the right and left front wheels, the right and left rear wheels, and the mower.
Figure 4:
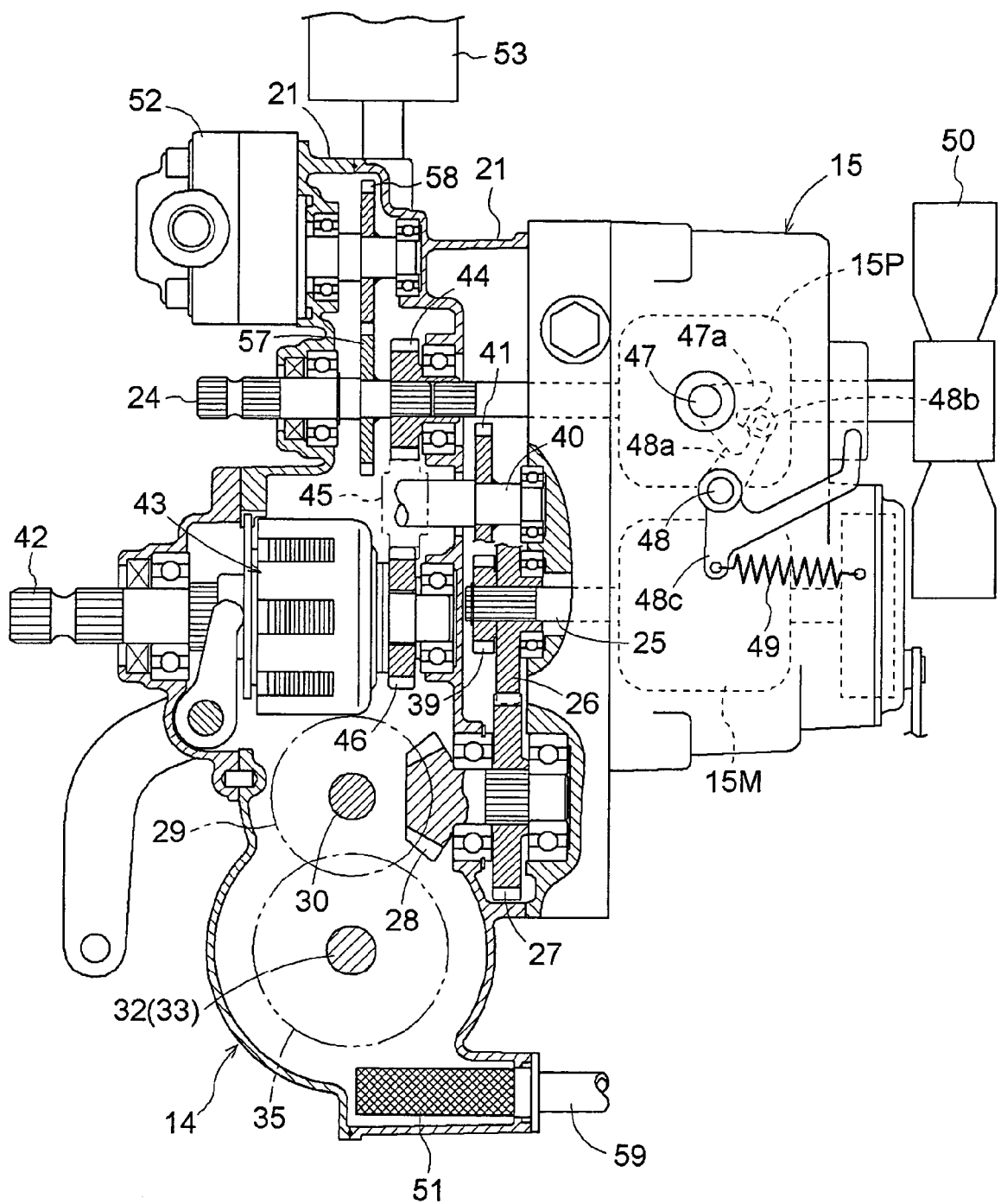
FIG. 4 is a vertical sectional lateral view of the vicinity of the left supporting portion of the transmission case.

As shown in FIGS. 3, 4 and 5, a frontward-pointing input shaft 24 is provided at the upper portion of the left supporting portion 21 of the transmission case 14. A transmission shaft 14 is connected to the input shaft 24 so that the motive power of the engine 4 is transmitted via the transmission shaft 14 to the input shaft 24. Inside the left supporting portion 21 of the transmission case 14, the motive power of the input shaft 24 is transmitted to a hydraulic pump 15P of the hydrostatic continuously variable transmission 15, and transmitted to a hydraulic motor 15M of the hydrostatic continuously variable transmission 15. Motive power is transmitted from the hydrostatic continuously variable transmission 15 via an output gear 25, transmission gears 26 and 27 and bevel gears 28 and 29 to a transmission shaft 30. A fan 50 that is rotationally driven by the motive force of the input shaft 24 is provided, and cooling air from the fan 50 is directed at the hydrostatic continuously variable transmission 15.

As shown in FIGS. 3, 4 and 5, a transmission shaft 32 is rotatably supported by cylindrical bearing portions 22*b* and a bearing 31 in the right supporting portion 20 and the middle portion 22 of the transmission case 14, and this transmission shaft 32 is arranged extending between the insides of the right supporting portion 20 and the middle portion 22 of the transmission case 14. Below the left supporting portion 21 of the transmission case 14, a transmission shaft 33 is rotatably supported by a cylindrical bearing portion 21*b* and a bearing 34, and a differential 35 is provided between the transmission shafts 32 and 33. A frontward-pointing output shaft 40 is provided at the upper portion of the left supporting portion 21 of the transmission case 14, and the transmission shaft 17 is connected to this output shaft 40.

Thus, as shown in FIGS. 3, 4 and 5, motive force is transmitted from the hydrostatic continuously variable transmission 15 via the output shaft 25, the transmission gears 26 and 27, and the bevel gears 28 and 29 to the transmission shaft 30, and the motive force of the transmission shaft 30 is transmitted via the transmission gear 37, the differential 35, the transmission shafts 32 and 33, the transmission gears 38, and the right and left axles 36 to the right and left rear wheels 2. Motive force is also transmitted from the hydrostatic continuously variable transmission 15 via the output shaft 25, the transmission gears 39 and 41, the output shaft 40, the transmission shafts 17 and 18, and the front axle case 12 to the right and left front wheels 1.

As shown in FIGS. 3, 4 and 5, a frontward-pointing PTO shaft 42 is provided at the upper portion of the left supporting portion 21 of the transmission case 14. The transmission shaft 19 is connected to the PTO shaft 42, and a frictional multi-disk PTO clutch 43 is provided on the PTO shaft 42. Thus, motive power is transmitted from the input shaft 24 to the mower 6 via a transmission gear 44, a transmission gear 45, a transmission gear 46, the PTO clutch 43, the PTO shaft 42 and the transmission shaft 19. The transmission gear 45 is fitted onto the output shaft 40, such that the two can rotate relatively to one another.

The hydrostatic continuously variable transmission 15 can be set to a high-speed forward, a high-speed reverse and a neutral position, and is configured to provide continuously variable shifting. The hydrostatic continuously variable transmission 15 is operated with a change pedal (not shown in the drawings) provided in the operator's station 23. As shown in FIG. 4, a trunnion shaft 47 is provided for operating the hydrostatic continuously variable transmission 15 to the high-speed forward, the high-speed reverse and the neutral position by changing the angle of an oblique plate (not shown in the drawings) in the hydraulic pump 15P of the hydrostatic continuously variable transmission 15. The trunnion shaft 47 protrudes out of the hydrostatic continuously variable transmission 15, and the change pedal and the trunnion shaft 47 are mechanically linked.

As shown in FIG. 4, a cam member 47*a* is fastened to the trunnion shaft 47 inside the hydrostatic continuously variable transmission 15. An operating shaft 48 is provided in the hydrostatic continuously variable transmission 15. An operating arm 48*a* is fastened to the operating shaft 48 inside the hydrostatic continuously variable transmission 15, and a bearing 48*b* is supported by the operating arm 48*a*. Outside the hydrostatic continuously variable transmission 15, an operating arm 48*c* is fastened to the operating shaft 48, and a spring 49 is connected to the operating arm 48*c* of the operating shaft 48. Thus, the spring force of the spring 49 presses the operating arm 48*a* and the bearing 48*b* of the operating shaft 48 against the cam member 47*a* of the trunnion shaft 47, and the trunnion shaft 47 (and hence the hydrostatic continuously variable transmission 15) is biased to the neutral position.

The following is a description of the hydraulic circuit configuration.

Figure 10:
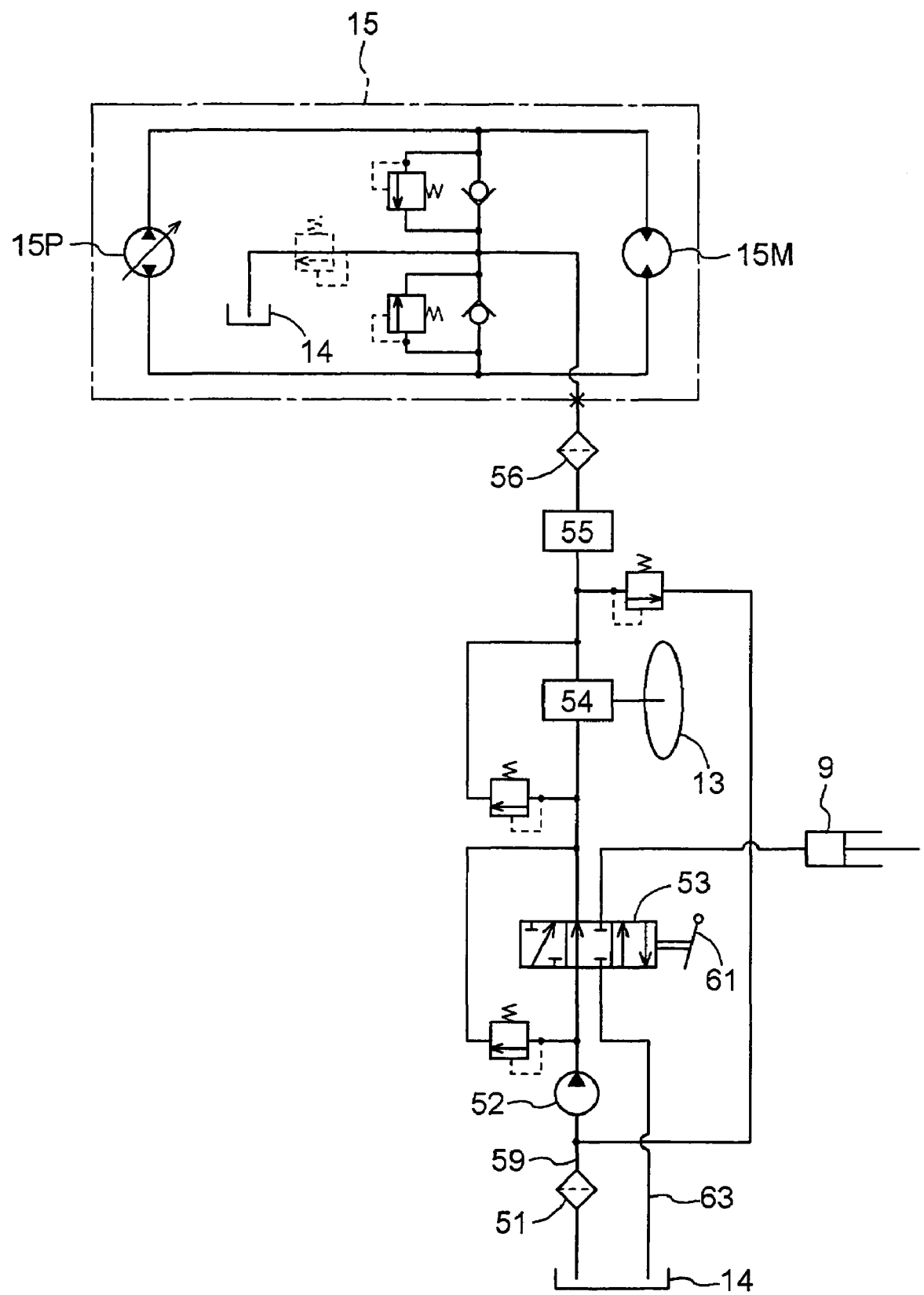
FIG. 10 is a diagram showing the hydraulic circuit configuration.

As shown in FIG. 5, hydraulic fluid is filled as lubricating oil into the transmission case 14, and functions as an oil bath. The oil surface A of the hydraulic fluid is slightly above the PTO clutch 43, near the output shaft 40. As shown in FIG. 10, the hydraulic fluid in the transmission case 14 is supplied from a strainer 51 to a pump 52, and then the hydraulic fluid is supplied from the pump 52 to a control valve 53, a power steering mechanism 54 of the right and left front wheels 1 that are steered by the steering handle 13, an oil cooler 55 (see FIG. 1), a filter 56, and the hydraulic circuit system of the hydrostatic continuously variable transmission 15. From the hydraulic circuit system of the hydrostatic continuously variable transmission 15, the hydraulic fluid is returned to the transmission case 14.

As shown in FIGS. 3 and 4, the pump 52 is coupled to the upper portion of the front part of the left supporting portion 21 of the transmission case 14, and the motive force of the input shaft 24 is transmitted via transmission gears 57 and 58 to the pump 52. The strainer 51 is provided at the lower portion of the rear part of the left supporting portion 21 of the transmission case 14, and a duct 59 connects the strainer 51 with the pump 52.

As shown in FIGS. 4, 5 and 10, the control valve 53 (corresponding to a hydraulic device) is coupled to the upper portion of the front part of the left supporting portion 21 of the transmission case 14. The control valve 53 can be switched between a lifted position in which the hydraulic fluid is supplied from the pump 52 to the lift cylinder 9, so that the mower 6 is lifted up by the lift cylinder 9, a stop position in which the hydraulic fluid is supplied from the pump 52 to the power steering mechanism 54, and discharge of hydraulic fluid from the lift cylinder 9 is stopped, and a lowered position in which the hydraulic fluid is supplied from the pump 52 to the power steering mechanism 54, and the hydraulic fluid is discharged from the lift cylinder 9, so that the mower 6 is lowered up by the lift cylinder 9. As shown in FIG. 1, a lift lever 61 is provided on the right-hand side of the driver seat 60 in the operator's station 23, and the control valve 53 can be set with the lift lever 61 to the lifted position, the neutral position and the lowered position.

The following is an explanation of the configuration for returning the hydraulic fluid from the control valve 53 to the transmission case 14.

As shown in FIGS. 5, 6, 7, 8 and 9, a series of grooves are formed along the abutting surface 21a on the right side (side of the duct 11) of the left supporting portion 21 of the transmission case 14, the abutting surface 22a on the upper side of the middle portion 22 of the transmission case 14, and the abutting surface 20a on the left side (side of the duct 11) of the right supporting portion 20 of the transmission case 14. Oil paths 63 are formed with these grooves by coupling the front parts of the right and left supporting portions 20 and 21 and the front part of the middle portion 22 of the transmission case 14 to the rear part of the right and left supporting portions 20 and 21 and the rear part of the middle portion 22 of the transmission case 14. A sealing member 64 is disposed outward from the oil path 63 in the abutting surface 21a of the left supporting portion 21 of the transmission case 14, the abutting surface 22a of the middle portion 22 of the transmission case 14, and the abutting surface 20a of the right supporting portion 20 of the transmission case 14.

Figure 7:
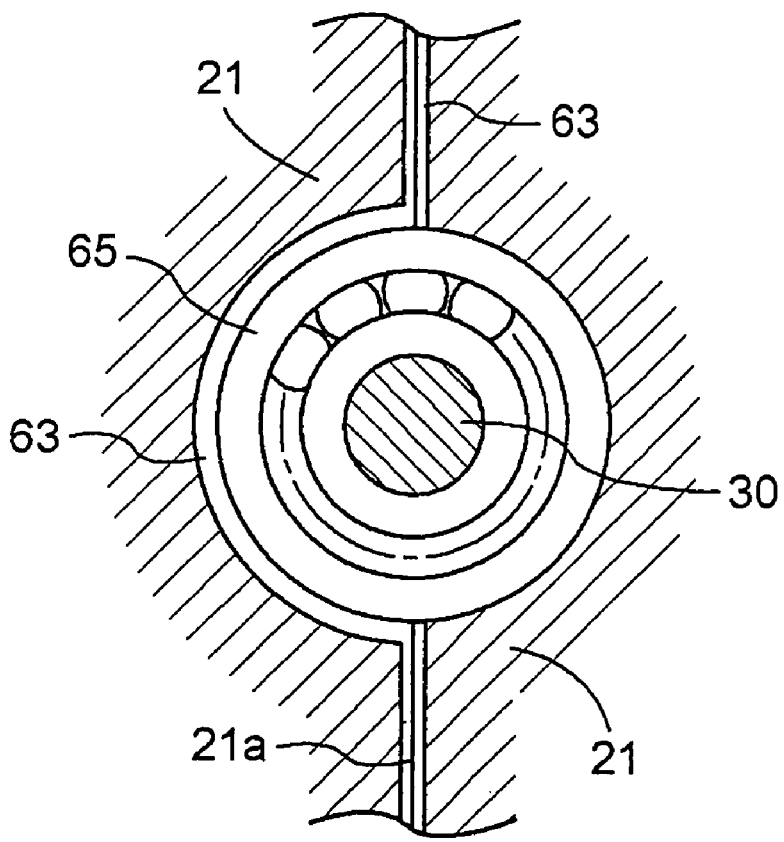
FIG. 7 is a vertical sectional lateral view of the vicinity of a bearing in the left supporting portion of the transmission case.
Figure 8:
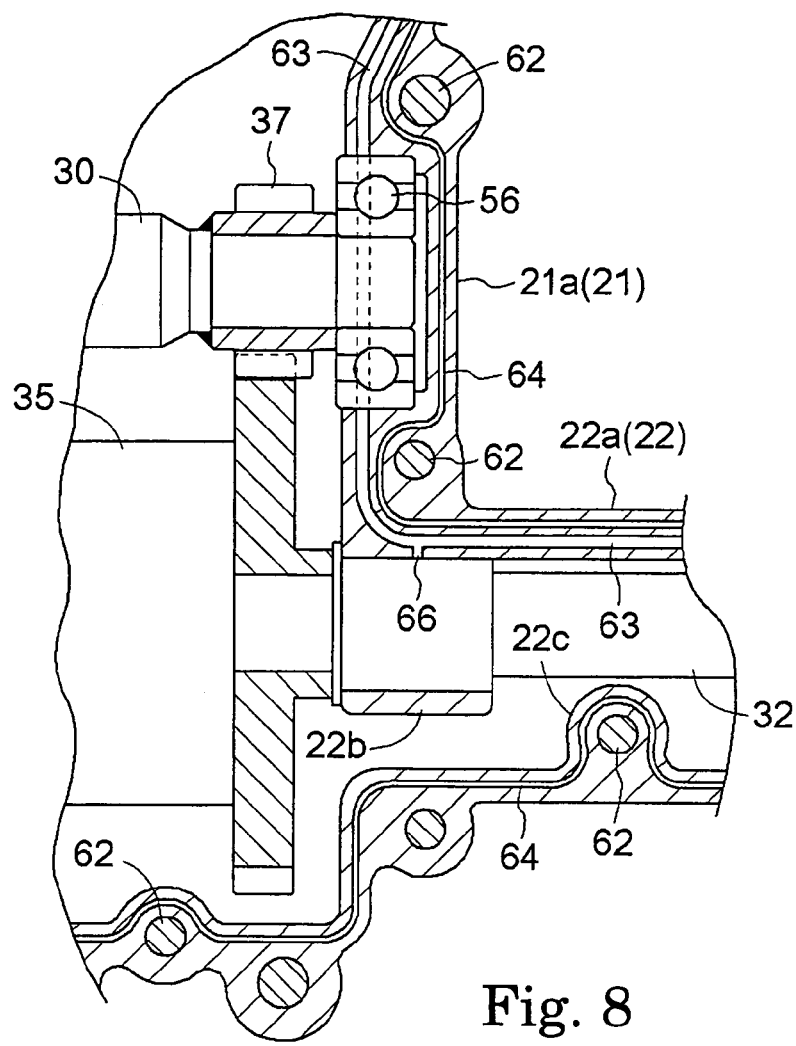
FIG. 8 is a vertical sectional view of the vicinity of the left supporting portion and the middle portion of the transmission case, taken from the rear.

As shown in FIGS. 5, 7 and 8, at the bearing 65 supporting the transmission shaft 30, a groove portion is formed in the portion that is located on the outer circumference of the bearing 65 in the abutting surface 21a on the right side (side of the duct 11) of the left supporting portion 21 of the transmission case 14, thus forming an oil path 63 with the groove and the circumferential portion of the bearing 65. As shown in FIGS. 5 and 8, at the bearing portions 22b of the middle portion 22 of the transmission case 14, oil path branches 66 that branch from the oil path 63 toward the bearing portions 22b of the middle portion 22 of the transmission case 14 are formed in the abutting surface 22a on the upper side of the middle portion 22 of the transmission case 14.

Figure 9:
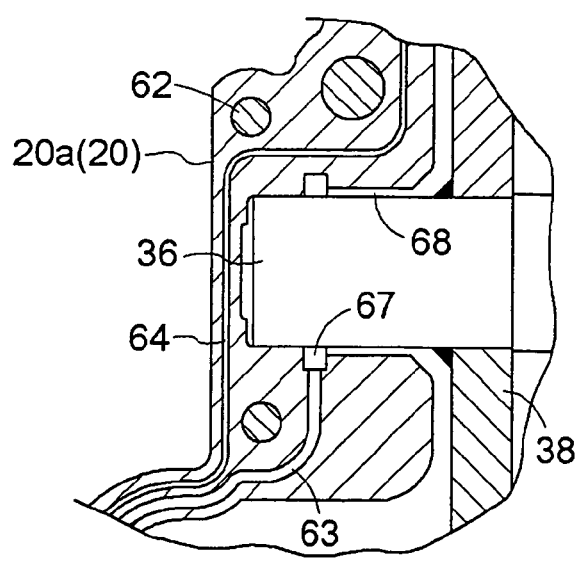
FIG. 9 is a vertical sectional lateral view of the vicinity of the right supporting portion of the transmission case.

As shown in FIGS. 5 and 9, a ring-shaped groove portion 67 is formed at a portion supporting the right axle 36 at the abutting surface 20a on the left side (side of the duct 11) of the right supporting portion 20 of the transmission case 14, a ring-shaped groove portion 68 that is in communication with the inside of the right supporting portion 20 of the transmission case 14 is formed from the groove portion 67, and the oil path 63 is connected to the groove portion 67. As shown in FIG. 5, the hydraulic fluid returning from the control valve 53 that is coupled to the upper portion of the front part of the left supporting portion 21 of the transmission case 14 is returned to the upper end of the oil path 63 in the left supporting portion 21 of the transmission case 14.

With the above-described configuration, as shown in FIGS. 5, 6, 7, 8 and 9, the hydraulic fluid returning from the control valve 53 is returned via the oil path 63 in the left supporting portion 21 of the transmission case 14, the oil path 63 in the middle portion 22 of the transmission case 14, the oil path 63 in the right supporting portion 20 of the transmission case 14, and the grooves 67 and 68 to the inside of the right supporting portion 20 of the transmission case 14. A portion of the hydraulic fluid of the oil path 63 in the middle portion 22 of the transmission case 14 is supplied via the oil path branches 66 to the bearing portions 22b of the middle portion 22 of the transmission case 14. The hydraulic fluid that has been returned to the inside of the right supporting portion 20 of the transmission case 14 is returned to the inside of the left supporting portion 21 of the transmission case 14 through the inside of the middle portion 22 of the transmission case 14.

As shown in FIGS. 5 and 8, a plurality of block-shaped wall portions 22c through which the bolts 62 are passed are formed in the vehicle's longitudinal direction at the bottom of the middle portion 22 of the transmission case 14. Thus, when the hydraulic fluid that has returned to the inside of the right supporting portion 20 of the transmission case 14 returns through the inside of the middle portion 22 of the transmission case 14 to the inside of the left supporting portion 21 of the transmission case 14 as described above, small debris in the hydraulic fluid is stopped by the wall portions 22c of the middle portion 22 of the transmission case 14, so that any small debris in the hydraulic fluid accumulates near the wall portions 22c or between adjacent wall portions 22c of the middle portion 22 of the transmission case 14.

Other Embodiments of the Invention

In the configuration of the transmission case 14 described in the foregoing DETAILED DESCRIPTION OF PREFERRED EMBODIMENTS, left and right as shown in FIG. 5 may also be reversed (such that the hydrostatic continuously variable transmission 15 is coupled to the right supporting portion 20 of the transmission case 14, moreover the input shaft 24, the output shaft 40, the PTO shaft 42 and the differential 35 are provided at the right supporting portion 20 of the transmission case 14, and the pump 52 and the control valve 53 are coupled to the upper portion of the right supporting portion 20 of the transmission case 14).

In the FIGS. 5, 6, 7, 8 and 9 of the above-described DETAILED DESCRIPTION OF PREFERRED EMBODIMENTS, it is also possible to form a series of grooves only in the abutting surface 21a on the right side (side of the duct 11) of the front part of the left supporting portion 21 of the transmission case 14, the abutting surface 22a on the upper side of the front part of the middle portion 22 of the transmission case 14 and the abutting surface 20*a* on the left side (side of the duct 11) of the front part of the right supporting portion 20 of the transmission case 14, to form the oil path 63. Conversely, it is also possible to form a series of grooves only in the abutting surface 21*a* on the right side (side of the duct 11) of the rear part of the left supporting portion 21 of the transmission case 14, the abutting surface 22*a* on the upper side of the rear part of the middle portion 22 of the transmission case 14 and the abutting surface 20*a* on the left side (side of the duct 11) of the front part of the right supporting portion 20 of the transmission case 14, to form the oil path 63.

The present invention can be applied to any vehicle with a transmission case having a first and second case portions and a middle portion that connect lower portions of the first and second case portions. That is, a first and second case portions (although they correspond to the right and left supporting portions) do not have to be the right and left supporting portions that support right and left wheels respectively. In this case, the first and second case portions may be aligned, for example, in a fore-and-aft direction with respect to the vehicle and the corresponding abutting surface, that divides the transmission case and that defines the oil path, may extend in the corresponding direction, that is, vertical and fore-and-aft directions with respect to the vehicle.

What is claimed is:

1. A work vehicle comprising:
   a plurality of wheels;
   a vehicle body supported by the wheels;
   a transmission case provided on the vehicle body, the transmission case having a first case portion and a second case portion and a middle portion extending between respective lower portions of the first and second case portions, the transmission case being divided into a first side and a second side each having an abutting surface extending in a vertical direction of the vehicle;
   a hydraulic device associated with the transmission case;
   a hydraulic pump supplying a hydraulic fluid to the hydraulic device;
   an oil path, wherein substantially the entire oil path is formed by the abutting surfaces when the first side and the second side of the transmission case are joined together, one end of the oil path being formed in the first case portion as an oil port for the hydraulic device, and the other end of the oil path opening to the second case portion; and
   a hydraulic fluid outlet provided to the first case and connected to the hydraulic pump to supply hydraulic fluid to the hydraulic pump.

2. The work vehicle according to claim 1, wherein
   the first case portion forms at least a part of a left supporting portion supporting a wheel on a left hand side of the vehicle,
   the second case portion forms at least a part of a right supporting portion supporting a wheel on a right hand side of the vehicle,
   the middle portion connects the right and left supporting portions and accommodates a transmission axle linking the left and right wheels, and
   the abutting surface extends laterally and vertically with respect to the vehicle.

3. The work vehicle according to claim 2 further comprising:
   a mower supported by the work vehicle;
   a grass collector attached to the rear of the vehicle body; and
   wherein the right and left wheels are right and left rear wheels and , wherein the work vehicle further comprises:
   a duct that passes between the right and left rear wheels and is connected to the grass collector, the duct guiding grass cut by the mower to the grass collector;
   wherein the middle portion is arranged below the duct.

4. The work vehicle according to claim 2, wherein the right and left wheels are right and left rear wheels.

5. The work vehicle according to claim 1, wherein a wall portion, extending in a direction perpendicular to a plane of the abutting surface, is provided at the bottom inside the middle portion of the transmission case such that the hydraulic fluid passing through the middle portion needs to go over the wall portion.

6. The work vehicle according to claim 1, wherein, at a portion near a bearing portion of a transmission shaft at the abutting surface of the transmission case, the oil path is provided with an oil path branch for supplying the hydraulic fluid of the oil path of the transmission case to the bearing portion of the transmission shaft.

\* \* \* \* \*